Nov. 22, 1955  R. L. FARNSWORTH  2,724,316
CULTIVATING TOOL
Filed Feb. 9, 1953

INVENTOR,
REUBEN L. FARNSWORTH,
BY *A. E. Fisher*
ATTORNEY

# United States Patent Office 2,724,316
Patented Nov. 22, 1955

2,724,316

CULTIVATING TOOL

Reuben L. Farnsworth, Royal Oak, Mich.

Application February 9, 1953, Serial No. 335,874

1 Claim. (Cl. 97—59)

This invention pertains to cultivating tools such as are used in gardening to loosen the soil around plants.

An object of this invention is to provide such a tool which will be cheap to manufacture and easy to use. Another object is to provide such a tool which may be used freely amid the foliage of growing plants without danger of catching in the foliage and injuring the plants.

Generally stated, the tool of this invention comprises a smooth, straight shank formed at its rear end into a handle and provided at its front end with a digging blade and a ground wheel to support the same while digging. The entire structure is narrow and smooth, without projections so that it may be moved through foliage without danger of catching.

Figure 1:
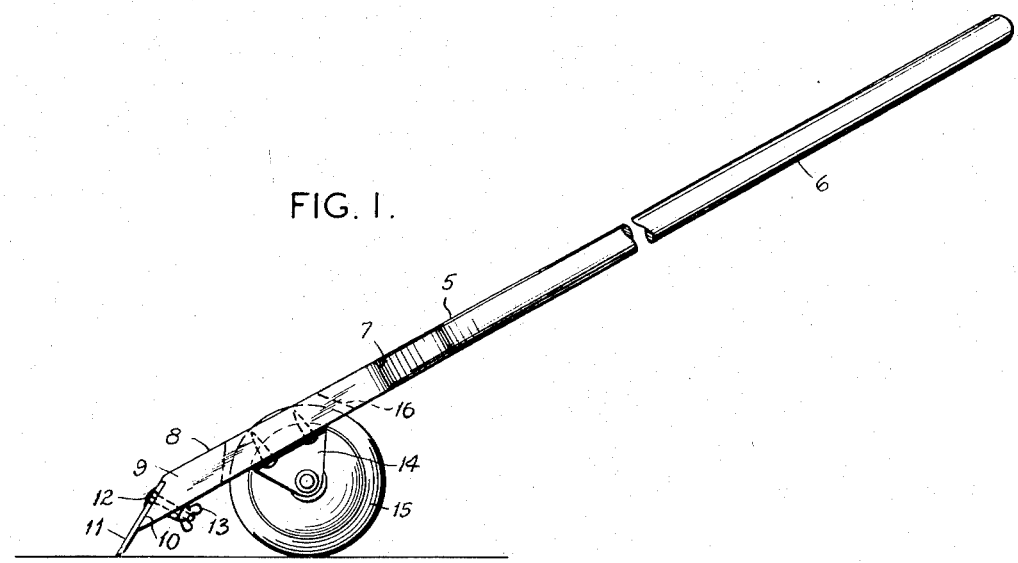
Figure 2:
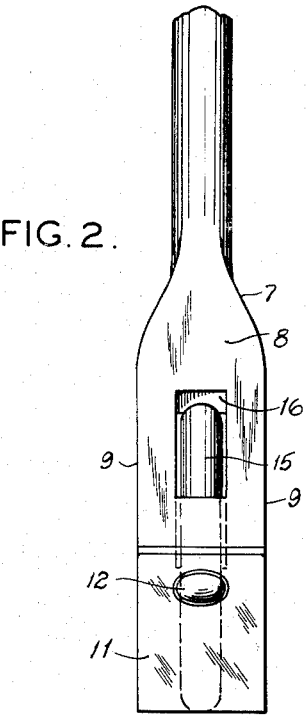
Figure 3:
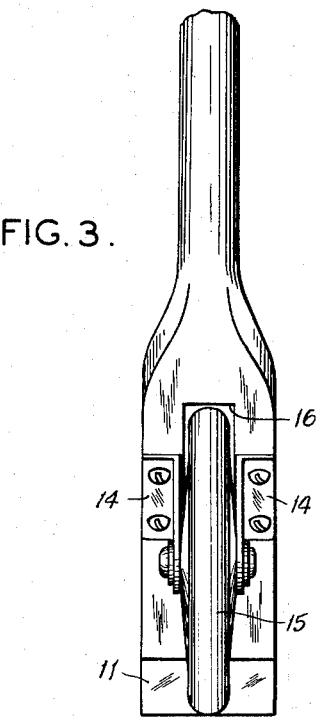

A preferred embodiment of this invention is illustrated in the accompanying drawing, in which Figure 1 is a side view of a cultivating tool embodying this invention, Figure 2 is an enlarged fragmentary front view of the same, and Figure 3 is a similar rear view of the same.

Referring now to the drawing, 5 designates generally a shank or bar, usually of wood, formed at its rear end into a round handle 6 and at its front end into a slightly enlarged or widened body portion 7, said body portion having a front face 8 and side faces 9. All said faces are formed smooth and without projections of any kind.

The front end of the body portion 7 is beveled to form a face 10 at a digging angle with the ground. A flat digging blade 11 is removably secured to the face 10 by a bolt 12 and wing nut 13 or other suitable fastener. The blade 11 is of substantially the same width as the body portion 7 so as not to project therebeyond.

Attached to the under side of the body portion 7 is a pair of bearing brackets 14 in which a ground wheel 15 is journaled. The body portion 7 is recessed as shown at 16 to receive the upper portion of the wheel 15, but, as shown in Figure 1, said wheel is located substantially wholly below the front face 8 of said body portion. The wheel 15 and the brackets 14 are positioned and dimensioned to be confined within the lateral width of the body portion, thereby to avoid projections beyond the faces 8 which might catch in foliage when in use.

In the use of this device the tool is held in the position of Figure 1 and moved forward and back. By raising the handle 6 and blade 11 may be made to dig into the ground, lifting and turning over the soil to form a mulch. The wheel 15 follows in the furrow cut by the blade 11, and also provides a fulcrum for controlling the depth of cut by manipulation of the handle 6.

It has been found that this tool can be used freely and rapidly in cultivating between rows of garden plants. The effort required is small and no care need be taken to avoid entanglement with the foliage.

Having described the invention, what is claimed is:

A cultivating tool comprising, a handle formed with a slightly widened body portion at its lower end, said body portion having smooth front and side faces and being without projections, bearing brackets on the rear face of said body portion, a ground wheel journaled in said brackets, said brackets and wheel being confined wholly within the lateral width of said body portion, said body portion being formed with a flat blade-seat at its front end at a greater angle to the ground that that of the handle when held in its normal working position by an operator, and a flat digging blade no wider than said body portion secured to said seat and positioned at the angle thereof to dig into the ground upon forward movement of the tool, whereby the tool may be moved under and through the foliage of a growing plant without damage to such foliage.

References Cited in the file of this patent

UNITED STATES PATENTS

| 887,275 | Rumpel | May 12, 1908 |
| 1,107,919 | Douglass | Aug. 18, 1914 |
| 1,962,025 | May | June 5, 1934 |
| 2,439,288 | Evans | Apr. 6, 1948 |

FOREIGN PATENTS

| 601,606 | France | Dec. 5, 1925 |